(12) United States Patent
Kedziersk et al.

(10) Patent No.: US 12,139,093 B2
(45) Date of Patent: Nov. 12, 2024

(54) INFLATABLE AIRBAG

(71) Applicant: Autoliv Development AB, Vargarda (SE)

(72) Inventors: Mateusz Kedziersk, Olawa (PL); Przemyslaw Siecla, Olawa (PL)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/251,998

(22) PCT Filed: Sep. 30, 2021

(86) PCT No.: PCT/EP2021/076957
§ 371 (c)(1),
(2) Date: May 5, 2023

(87) PCT Pub. No.: WO2022/100922
PCT Pub. Date: May 19, 2022

(65) Prior Publication Data
US 2023/0406255 A1    Dec. 21, 2023

(30) Foreign Application Priority Data

Nov. 10, 2020   (DE) ............... 10 2020 129 621.5

(51) Int. Cl.
*B60R 21/231*     (2011.01)
*B60R 21/235*     (2006.01)
*B60R 21/36*      (2011.01)

(52) U.S. Cl.
CPC .......... *B60R 21/231* (2013.01); *B60R 21/235* (2013.01); *B60R 2021/23509* (2013.01); *B60R 2021/23538* (2013.01); *B60R 21/36* (2013.01)

(58) Field of Classification Search
CPC ..... B60R 21/231; B60R 21/235; B60R 21/36; B60R 2021/23509; B60R 2021/23533;
(Continued)

(56) References Cited

U.S. PATENT DOCUMENTS 5,011,183 A * 4/1991 Thornton ................. D03D 1/02
139/389
6,478,332 B1 * 11/2002 Ono ...................... B60R 21/231
280/743.1
(Continued)

FOREIGN PATENT DOCUMENTS

DE    10 2012 003746 A1    8/2013
DE    10 2014 109976 A1    6/2015
(Continued)

*Primary Examiner* — Laura Freedman
(74) *Attorney, Agent, or Firm* — DICKINSON WRIGHT PLLC

(57) ABSTRACT

An inflatable airbag for a motor vehicle, the airbag comprises a pair of superimposed layers of fabric which are interconnected by a peripheral seam extending around and defining the bounds of a single inflatable chamber between said layers. The inflatable chamber has an inlet region comprising a fluid inlet connected to an inflator. First and second peripherally spaced-apart regions of the peripheral seam are secured to one another such that the inlet region is superimposed with at least one other region of the inflatable chamber to thereby induce an inflated shape to the chamber upon inflation of the airbag by a flow of gas from said inflator, the inflated shape being characterised by least one said other region of the inflatable chamber lying adjacent said inflator upon inflation of the airbag.

16 Claims, 4 Drawing Sheets

(58) Field of Classification Search
CPC .......... B60R 2021/23538; B60R 2021/23542;
B60R 2021/23547; B60R 2021/23566;
B60R 2021/23571; B60R 2021/23576
See application file for complete search history.

(56) References Cited

U.S. PATENT DOCUMENTS

| | | | | |
|---|---|---|---|---|
| 6,832,779 | B2* | 12/2004 | Tajima | B60R 21/239 |
| | | | | 280/743.1 |
| 7,484,753 | B2* | 2/2009 | Sugimoto | B60R 21/207 |
| | | | | 280/730.1 |
| 9,227,590 | B2* | 1/2016 | Fujiwara | B60R 21/2338 |
| 10,017,146 | B2* | 7/2018 | Sugimori | B60R 21/26 |
| 10,259,420 | B2* | 4/2019 | Thomas | B60R 21/231 |
| 10,414,370 | B2* | 9/2019 | Schneider | B60R 21/2338 |
| 10,479,315 | B2* | 11/2019 | Zauritz | B60R 21/217 |
| 10,640,074 | B2* | 5/2020 | Jo | B60R 21/207 |
| 11,766,986 | B2* | 9/2023 | Byun | B60R 21/231 |
| | | | | 280/730.2 |
| 2006/0131859 | A1* | 6/2006 | Kumagai | B60R 21/235 |
| | | | | 280/743.1 |
| 2010/0300793 | A1 | 12/2010 | Hallneus | |
| 2015/0175121 | A1 | 6/2015 | Choi | |
| 2021/0261079 | A1 | 8/2021 | Hagg et al. | |
| 2024/0001881 | A1* | 1/2024 | Ishigaki | B60N 2/42718 |

FOREIGN PATENT DOCUMENTS

| | | |
|---|---|---|
| EP | 2607183 A1 | 6/2013 |
| EP | 3581441 A1 | 12/2019 |
| WO | 2009/070059 A1 | 6/2009 |

* cited by examiner

INFLATABLE AIRBAG

FIELD OF THE INVENTION

The present invention relates to an inflatable airbag. More particularly, the invention relates to an inflatable airbag for a motor vehicle safety device.

BACKGROUND

It is now very widely known to provide airbags in motor vehicles to provide protection to the occupants of the vehicle in the event of an accident, and more recently also to provide airbags arranged to inflate over a region of the outside of a vehicle in order to provide protection to pedestrians in the event that they are stuck by the vehicle. Airbags of all types have become rather sophisticated over the years, and many now have particular and somewhat complicated shapes dictated by their specific function, their required inflation characteristics, and the shape and configuration of the part of the vehicle to which they are to be mounted or into or across which they are intended to inflate. Such airbags are initially provided in the form of a tightly folded and/or rolled package provided within an airbag module mounted to the motor vehicle.

Conventionally, airbags are manufactured from woven fabric, and typically comprise two or more layers of fabric which are interconnected by seams. In many cases the layers of fabric are woven separately and then stitched together to provide stitched seams, but in some cases the layers may be adhesively bonded to one another to form bonded seams, or may be heat-fused together to form fused seams. In some cases, however, two layers of fabric may be woven simultaneously via a so-called one-piece-weaving technique in which the yarns of one fabric layer are interwoven with the yarns of the other fabric layer in some areas to thereby create woven seams in those areas which are integral to the weave of the airbag fabric.

Airbags generally have an inlet, which is typically connected directly to an inflator such as a gas generator, and which permits the inflow of inflating gas from the inflator to inflate the airbag. Such inflators are configured to produce a large volume and aggressive flow of inflating gas, and so the forces applied to the region of the airbag in which the inlet is provided are can be extremely high. In some circumstances this can make it difficult to achieve a desirable inflation characteristic for the airbag in the event that there are limitations on the possible location of the inflator. Additionally, inflators can present an injury risk to a vehicle occupant in the event that they must be located in close proximity to the occupant; for example through impact with the inflator in the event of a crash. Inflators can also become very hot during operation, which can present a burn risk to an occupant in close proximity to the inflator. It has thus been found that for some airbag installations it can be difficult to locate the inflator appropriately so as to ensure correct inflation characteristics whilst also ensuring that a vehicle occupant in close proximity to the inflator is adequately protected from the risk of injury arising from contact or impact with the inflator.

The present invention has been devised in light of the above considerations.

SUMMARY OF THE INVENTION

According to a first aspect of the present invention, there is provided an inflatable airbag for a motor vehicle; the airbag comprising a pair of superimposed layers of fabric interconnected by a peripheral seam extending around and defining the bounds of a single inflatable chamber between said layers; said inflatable chamber having an inlet region comprising a fluid inlet connected to an inflator; the airbag being characterised in that: first and second peripherally spaced-apart regions of said peripheral seam are secured to one another such that said inlet region is superimposed with at least one other region of the inflatable chamber to thereby induce an inflated shape to said chamber upon inflation of the airbag by a flow of gas from said inflator, said inflated shape being characterised by least one said other region of the inflatable chamber lying adjacent said inflator upon inflation of the airbag.

Optionally, said inflated shape is further characterised by at least one said other region of the inflatable chamber bearing against said inflator upon inflation of the airbag.

In some embodiments, said inflated shape optionally has a two-tiered configuration in which said inlet region bears against at least one said other region.

Conveniently, said pair of superimposed fabric layers comprise an upper fabric layer and a lower fabric layer, and wherein said inlet region of the inflatable chamber is superimposed with the or each said other region such that said lower fabric layer of the inlet region bears against said upper fabric layer of the or each other region when the airbag is inflated.

Optionally, said first and second regions of said peripheral seam are secured to one another such that said inlet region of said inflatable chamber is superimposed with two discrete other regions of said inflatable chamber.

Said inlet region of the inflatable chamber may overly said first and second regions of the peripheral seam.

According to a second aspect of the present invention, there is provided an inflatable airbag for a motor vehicle; the airbag comprising a pair of superimposed layers of fabric interconnected by a peripheral seam extending around and defining the bounds of a single inflatable chamber between said layers; the airbag being characterised in that: first and second peripherally spaced-apart regions of said peripheral seam are secured to one another to thereby induce a three-dimensional inflated shape to said chamber upon inflation of the airbag such that said peripheral seam follows a non-planar path.

In some embodiments of said second aspect of the present invention, said first and second regions of said peripheral seam are spaced-apart and secured to one another such that a first region of said inflatable chamber is superimposed with at least one other region of said inflatable chamber to thereby impart a two-tiered inflated configuration to at least part of said inflatable chamber upon inflation of the airbag.

Optionally, said first region of the inflatable chamber overlies said first and second regions of the peripheral seam.

Conveniently, said first region of said inflatable chamber may define an inlet to said inflatable chamber, the inlet being configured for engagement with an inflator.

In some embodiments of said second aspect of the invention, said pair of superimposed fabric layers comprise an upper fabric layer and a lower fabric layer, and said first region of the inflatable chamber is superimposed with the or each said other region such that said lower fabric layer of the first region bears against said upper fabric layer of the or each other region when the airbag is inflated.

Optionally, said first and second regions of said peripheral seam are secured to one another such that said first region of said inflatable chamber is superimposed with two discrete other regions of said inflatable chamber.

In embodiments of either said first or second aspects of the invention having two discrete other regions of said inflatable chamber, those regions may be of substantially identical shape and configuration In some embodiments of both aspects of the present invention, said first region of the peripheral seam bounds part of one said discrete other region of the inflatable chamber, said second region of the peripheral seam bounds part of the other said discrete other region of the inflatable chamber, and said two discrete other regions of the inflatable chamber are interconnected by connection of said first and second regions of the peripheral seam to one another.

Optionally, said two discrete other regions of said inflatable chamber may be substantially mirror symmetrical about said connection between the first and second regions of the peripheral seam.

Embodiments in accordance with both the first aspect and the second aspect of the present invention may be configured such that said peripheral seam has an interconnection width across which said layers of fabric are interconnected, and wherein said first and second regions of the peripheral seam are secured to one another by a connection formed wholly within said interconnection width.

Optionally, said interconnection width varies along said peripheral seam and is greater at said first and second regions of the peripheral seam than elsewhere along the seam. Alternatively, said interconnection width varies along said peripheral seam and is narrower at said first and second regions of the peripheral seam than elsewhere along the seam.

Said connection may comprise stitching. Alternatively, or additionally, said connection may comprise adhesive, or may be formed via the application of heat to fuse said first and second regions of the peripheral seam together. Alternatively, or additionally, said connection may comprise one or more rivets or other mechanical fasteners to secure said first and second regions of the peripheral seam together.

Optionally, said first and second regions of the peripheral seam are secured to one another by stitching. Alternatively, or additionally, said first and second regions of the peripheral seam may be secured to one another by one or more rivets or other mechanical fasteners.

Said first and second regions of the peripheral seam may be superimposed.

Embodiments in accordance with both the first and second aspects of the present invention may be configured such that each said layer of fabric is woven and comprises a plurality of yarns, at least some of the yarns of one said layer of fabric being interwoven with at least some of the yarns of the other said layer to define said peripheral seam, the peripheral seam thereby being woven and integral to the structure of said layers.

SUMMARY OF THE FIGURES

So that the invention may be more readily understood, and so that further features thereof may be appreciated, embodiments of the invention will now be described by way of example with reference to the accompanying drawings in which.

DETAILED DESCRIPTION OF THE INVENTION

Aspects and embodiments of the present invention will now be discussed with reference to the accompanying figures. Further aspects and embodiments will be apparent to those skilled in the art.

The invention disclosed herein is suitable for implementation in airbags of various and wide ranging different types such as, for example, driver airbags, front passenger airbags, rear passenger airbags, knee airbags, thorax airbags, side airbags, inflatable side curtains, and pedestrian airbags of a type intended to inflate across part of the exterior of a motor vehicle in order to offer protection to a pedestrian in the event of being struck by the motor vehicle.

Figure 1:
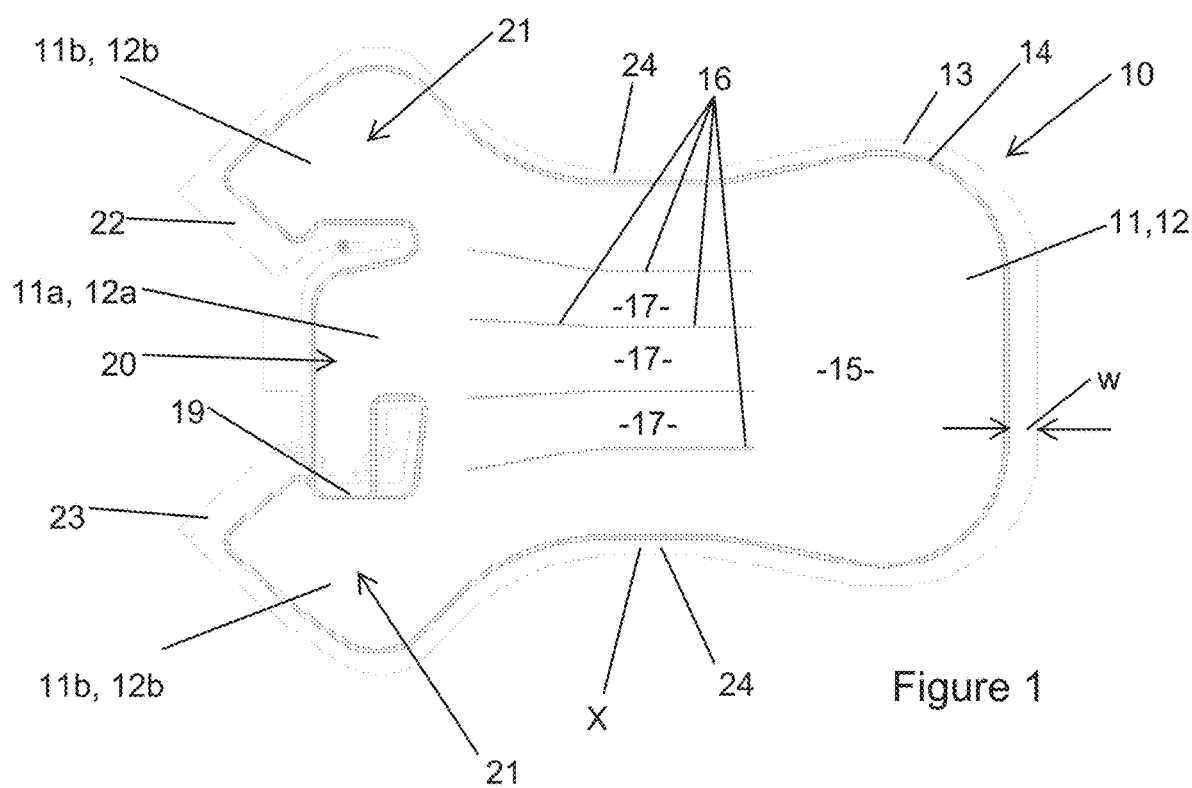
FIG. 1 is a plan view from above of a partially assembled airbag in accordance with both the first and second aspects of the present invention.

In FIG. 1, there is illustrated a partially constructed airbag 10 in accordance with the present invention, the airbag being shown in an uninflated condition and laid out flat.

The airbag 10 is formed from two layers of flexible fabric 11, 12 which are of substantially identical shape. The layers 11, 12 are shown arranged in superimposition in FIG. 1, with the upper layer 11 extending across the lower layer 12. The upper and lower layers 11, 12 are interconnected by a peripheral seam 13 which extends around and defines the bounds 14 of a single inflatable chamber 15 between the two layers.

In preferred embodiments of the invention, it is proposed that the interconnected layers 11, 12 of the airbag 10 will be woven simultaneously on a single loom, via a so-called 'one-piece weaving' technique in which yarns of one of the layers are interwoven with yarns of the other layer in specific areas to define the peripheral seam 13. In such embodiments, the resulting peripheral seam 13 is thus woven as an integral and part of both layers 11, 12 of fabric, whilst the layers remain separate from one another inside the bounds of the peripheral seam 13 to thereby define the inflatable chamber 15. As illustrated in FIG. 1, the yarns of the two layers 11, 12 may also be interwoven in other areas 16 so as to interconnect the two layers 11, 12 inside the bounds 14 of the peripheral seam 13. In the airbag illustrated in FIG. 1, the other interwoven areas 16 define an array of internal seams to thereby create a series of generally parallel inflatable cells 17 within the inflatable chamber 15 formed between the layers 11, 12.

It is to be appreciated, however, that whilst the airbag of the present invention may be particularly suited to fabrication via the type of one-piece weaving technique described above, it is not restricted to the use of such a technique. Indeed, it is envisaged that in other embodiments the peripheral seam 13, and also any required internal seams such as those indicated in areas 16 in FIG. 1, may be formed in other convenient ways apparent to those of skill in the art. For example, it is envisaged that in some embodiments the fabric layers 11, 12 may be formed entirely separately from one another as separate sheets and thereafter interconnected by seams which may be formed by conventional stitching to interconnect the fabric layers 11, 12, and/or may be created using adhesive to bond the fabric layers 11, 12 together, or which may even be formed by the application of heat to fuse the fabric layers 11, 12 together.

In the embodiment illustrated in FIG. 1, in which the peripheral seam 13 is formed via the one-piece weaving technique described above, it will be observed that the peripheral seam 13 has a transverse interconnection width w across which the yarns of the two layers 11, 12 are interwoven to thereby interconnect the layers 11, 12. As will be observed, the interconnection width w may vary somewhat along the peripheral seam 13, such that some regions of the peripheral seam 13 are wider than other regions.

It will be observed that in the case of the particular airbag 10 illustrated in FIG. 1, the interconnected fabric layers 11, 12 have a very approximately elongate rectangular shape. In more detail it will be observed that at one end (the left-hand end in FIG. 1), the fabric layers 11, 12 are each shaped to define a centrally located and somewhat L-shaped formation 11a, 12a which is positioned between a pair of substantially identically-shaped projecting wings 11b, 12b. The peripheral seam 13 interconnects the two fabric layers 11, 12 around their entire peripheral extent, including the wings 11b, 12b and the L-shaped formations, except for a short length along the aligned L-shaped formations 11a, 12a which remain unconnected to thereby define a fluid inlet 19 to the inflatable chamber 15. The aligned and interconnected L-shaped formations 11a, 12a of the two fabric layers 11, 12 cooperate to define a first region 20 of the inflatable chamber 15, whilst the aligned and interconnected wings 11b, 12b of the two fabric layers 11, 12 cooperate to define respective discrete wing regions 21 of the inflatable chamber 15. More particularly, the first region of the inflatable chamber 15 defines an inlet region of the inflatable chamber 15 which is configured for connection to an inflator, as will be described in more detail below.

It will be observed in FIG. 1 that one pair of wings 11b, 12b of the fabric layers are interconnected by a first straight region 22 of the peripheral seam 13, whilst the other pair of wings 11b, 12b are interconnected by a second straight region 23 of the peripheral seam 13. The first and second straight regions 22, 23 of the peripheral seam 13 may be of equal length to one another, and each bound part of a respective wing region 21 of the inflatable chamber 15. As will be appreciated, the first and second regions 22, 23 of the peripheral seam 13 are peripherally spaced-apart from one another, in the sense that they are each located at respective spaced-apart positions around the seam 13. Furthermore, it will be noted that in the particular airbag configuration illustrated in FIG. 1, the aforementioned first and second straight regions 22, 23 of the peripheral seam 13 each have an interconnection width w which is greater than elsewhere along the seam 13, such as the regions indicated by reference number 24 along the sides of the main central area of the inflatable chamber 15 which have a relatively narrow interconnection width w. However, this is not considered an essential aspect of the proposal, and in other embodiments it is envisaged that the first and second straight regions 22, 23 of the peripheral seam 13 may have an interconnection width w which is smaller than elsewhere along the seam 13. For example, embodiments are envisaged in which the interconnection width w of the peripheral seam 13 varies around the seam as a function of distance from a datum point. An example datum point X is shown in FIG. 1, which is located along the peripheral seam 13 in a generally longitudinally central position along the length of the airbag 10, where the width of the airbag 10 is narrowest. It is envisaged that the interconnection width w will be greater in regions of the peripheral seam distal to the datum point X than in regions of the peripheral seam proximal to the datum point X. Embodiments are therefore possible, for example in the case of particularly large airbags, in which regions of the peripheral seam 13 remote from the datum point X may have an interconnection width w which is in fact greater than the interconnection width of the first and second regions 22, 23.

Figure 2:
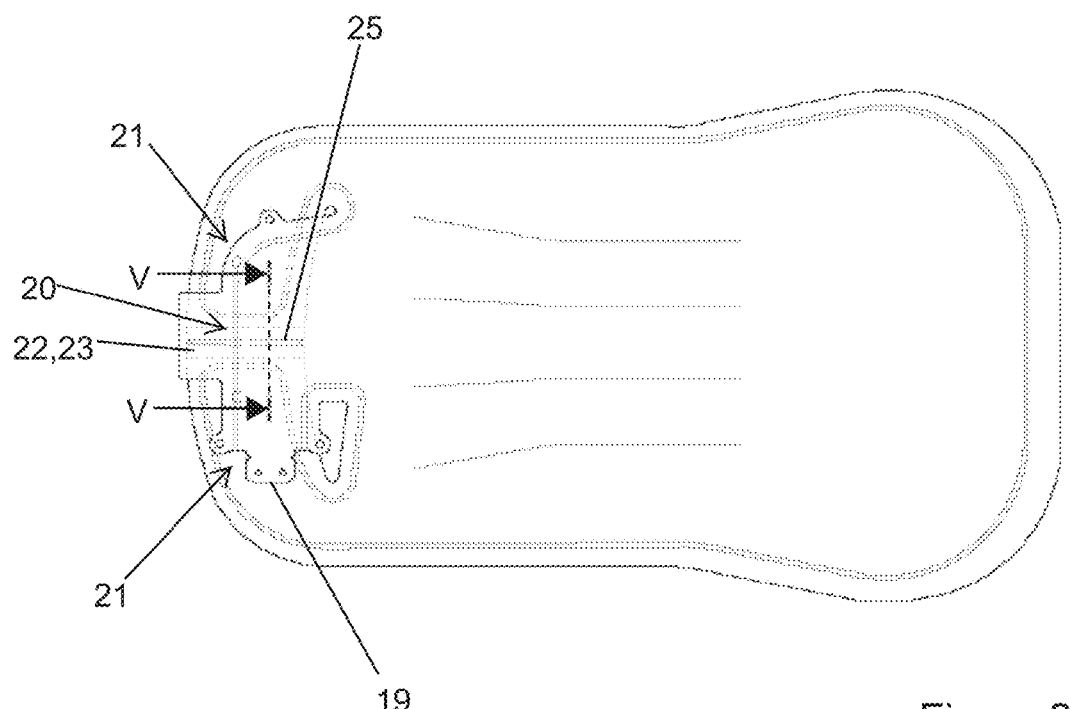
FIG. 2 is a plan view from above of the airbag of FIG. 1, showing a first inlet region of the inflatable chamber superimposed with two other regions of the inflatable chamber.
Figure 4:
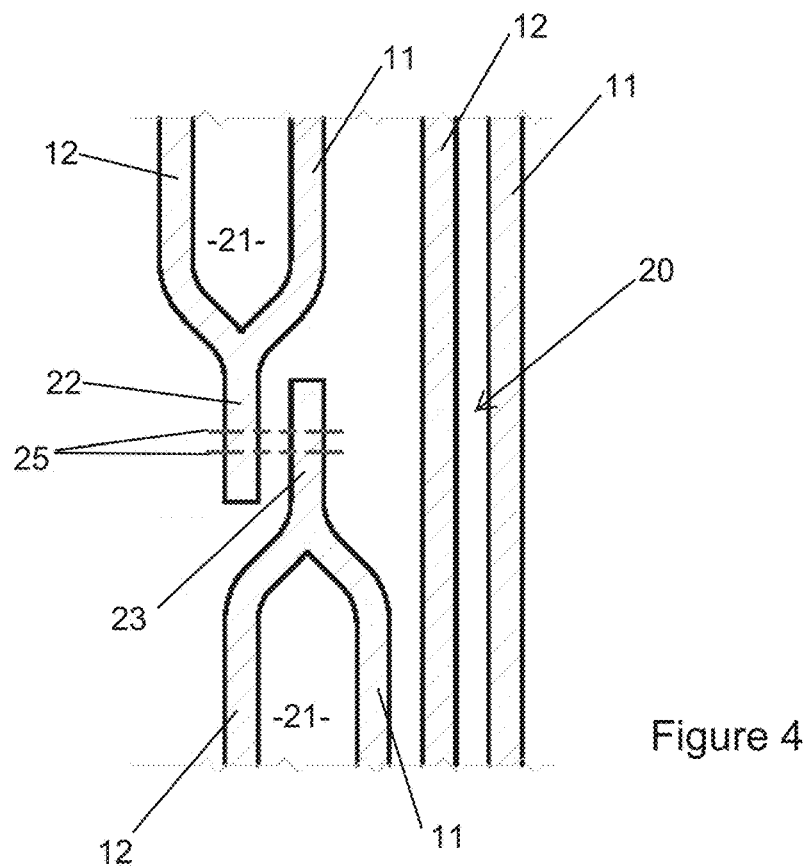
FIG. 4 is a cross-sectional view, taken along line V-V in FIG. 2.

Turning now to consider FIG. 2, the airbag 10 is illustrated following a subsequent step in its construction. In particular, FIG. 2 shows the airbag 10 after the two wing regions 21 of the inflatable chamber 15 have been manipulated and moved underneath the inlet region 20 such that their respective first and second straight regions 22, 23 of the peripheral seam 13 overlie one another in superimposition. The superimposed relationship of the first and second straight regions 22, 23 of the peripheral seam 13 is illustrated most clearly in the cross-sectional view of FIG. 4. In this configuration, it will be observed that part of the inlet region 20 of the inflatable chamber 15 becomes superimposed across the top of part of each wing region 21. Furthermore, it is to be noted that in this configuration the two wing regions 21 of the inflatable chamber 15 are not turned or folded over on themselves, and so the lower fabric layer 12 of the inlet region 20 lies across the top of the upper fabric layer 11 of each wing region 21.

The superimposed first and second straight regions 22, 23 of the peripheral seam 13 are then secured to one another. In preferred embodiments this is achieved by the creation of one or more lines of stitching 25 to form a connection interconnecting the first and second regions 22, 23 of the peripheral seam 13. This is illustrated most clearly in FIG. 3 which shows the end region of the airbag 10 as viewed from below. The connection of the first and second regions 22, 23 of the peripheral seam 13 to one another thereby also interconnects the two wing regions 21 of the inflatable chamber 15. It is to be noted, however, that in alternative embodiments it is envisaged that the regions 22, 23 of the peripheral seam 13 may be secured to one another in other convenient ways apparent to those of skill in the art. For example, it is envisaged that in some embodiments the regions 22, 23 may be secured to one another by using adhesive to bond the regions 22, 23 together, or may even be fused together using the application of heat. In other embodiments it is envisaged that the regions 22, 23 may be secured to one another via the use of rivets or other such fasteners.

Figure 3:
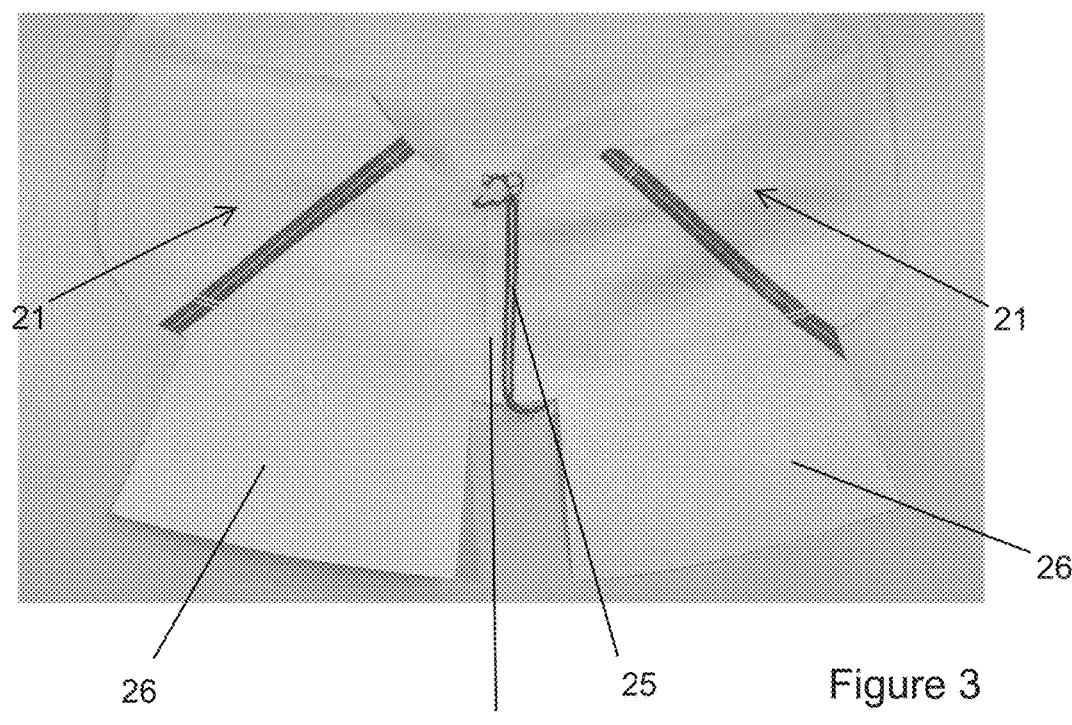
FIG. 3 is a view from below of the airbag of FIG. 2 showing said two other regions of the inflatable chamber in more detail.

It is to be appreciated at this juncture that FIG. 3 shows a pair of optional mounting tabs 26 of the airbag 10 which are not illustrated in FIGS. 1 and 2. Each mounting tab 26 projects outwardly from a respective wing region 21. The mounting tabs 26 may be provided to facilitate fixture of the airbag 10 to the structure of a motor vehicle. As will be appreciated, in other embodiments the mounting tabs 26 may be provided at other positions around the airbag.

It is considered preferable for the or each line of stitching 25 securing the first and second regions 22, 23 of the peripheral seam 13 to one another to be formed wholly within the interconnection width w of the peripheral seam in those regions.

Having regard to FIG. 2, it will be noted that in the illustrated embodiment the two wing regions 21 of the inflatable chamber 15 are substantially mirror symmetrical about the connection formed by the stitching 25 interconnecting the first and second regions 22, 23 of the peripheral seam.

Figure 5:
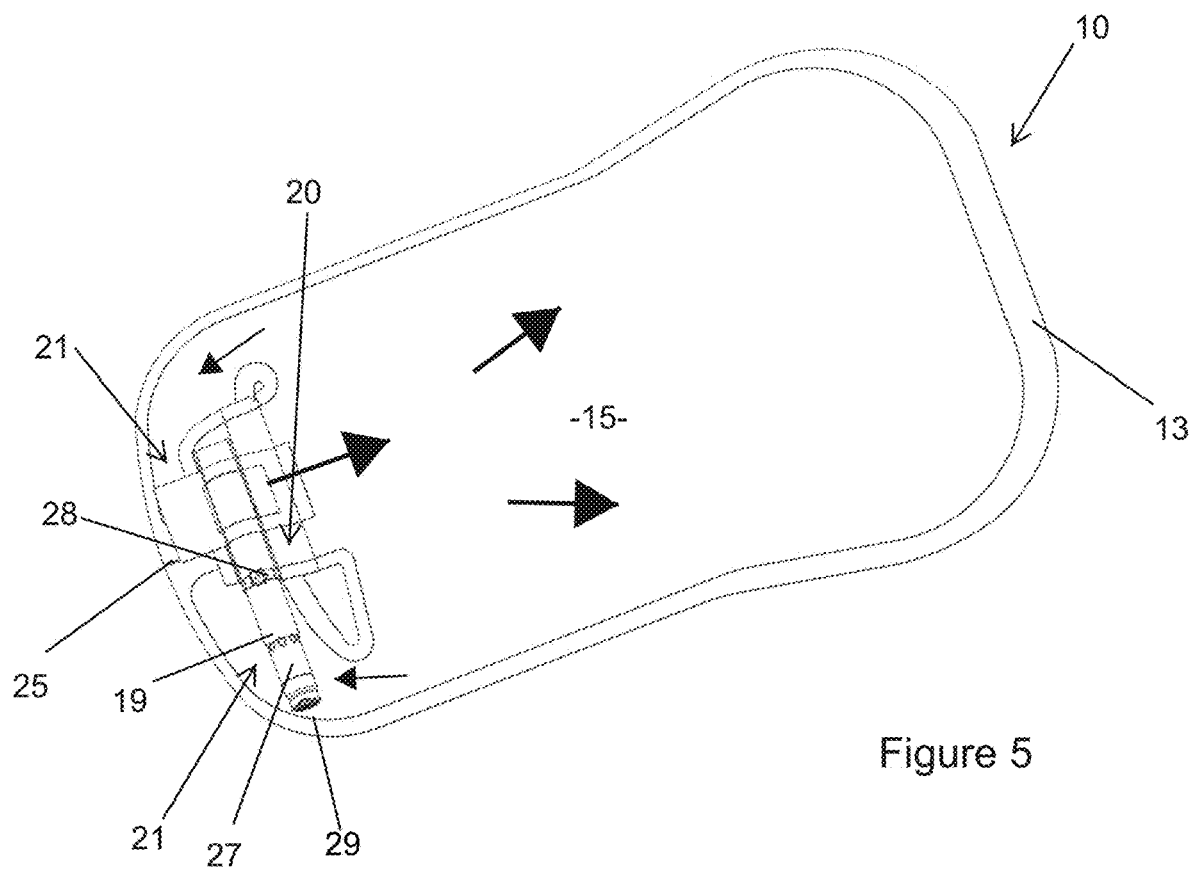
FIG. 5 is a schematic perspective view showing the airbag in combination with an inflator, prior to inflation.

Turning now to consider FIG. 5, the completed airbag 10 is illustrated in combination with an inflator 27 which may be, for example, a gas generator of a type known per se. The inflator 27 is elongate and generally cylindrical in form and is connected to the fluid inlet 19 of the airbag 10 by insertion therethrough such that the majority of the inflator's length sits inside the inlet region 20 of the inflatable chamber 15. A clamp 28 is provided around the fabric of the inlet region 20 proximate the fluid inlet 19, to thereby secure the inflator to the airbag 10. As will be appreciated by those of skill in the art, the inflator 27 comprises a series of gas outlets which are thus positioned inside the inlet region 20 of the inflatable chamber 15, whilst the exposed end of the inflator comprises an electrical connector 29 for connection to circuitry, which will typically comprise a crash sensor and an electronic control unit, and which is operable to detect the occurrence of an impact or crash, and thereupon send an actuation signal to the inflator to actuate the inflator. Actuation of the inflator is effective to direct a flow if inflating gas into the inlet region 20 of the inflatable chamber 15, the inflating gas being directed from there into the main region of the inflatable chamber 15 in order to inflate the airbag 10, and from there into the two wing regions 21, as indicated generally by the arrows in FIG. 5.

Figure 6:
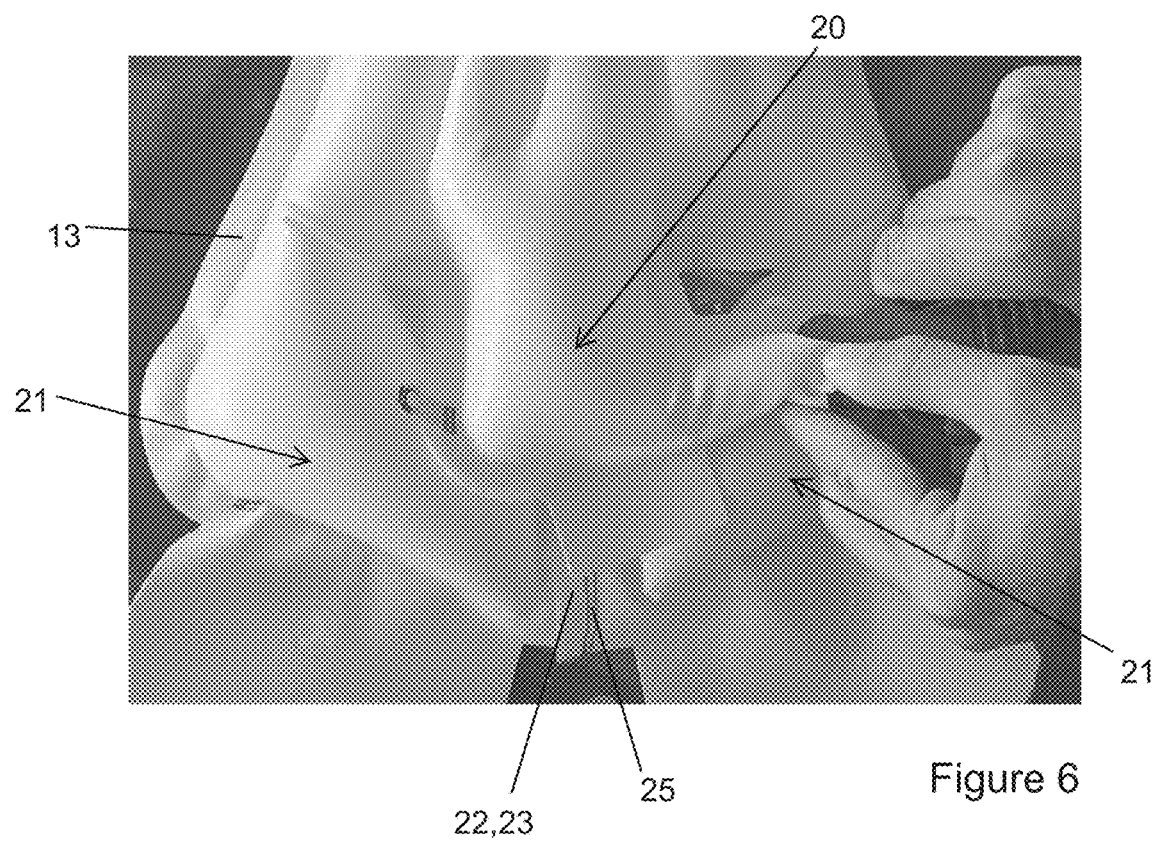
FIG. 6 is a view from above, illustrating the inlet region of the inflatable chamber in an inflated condition.
Figure 7:
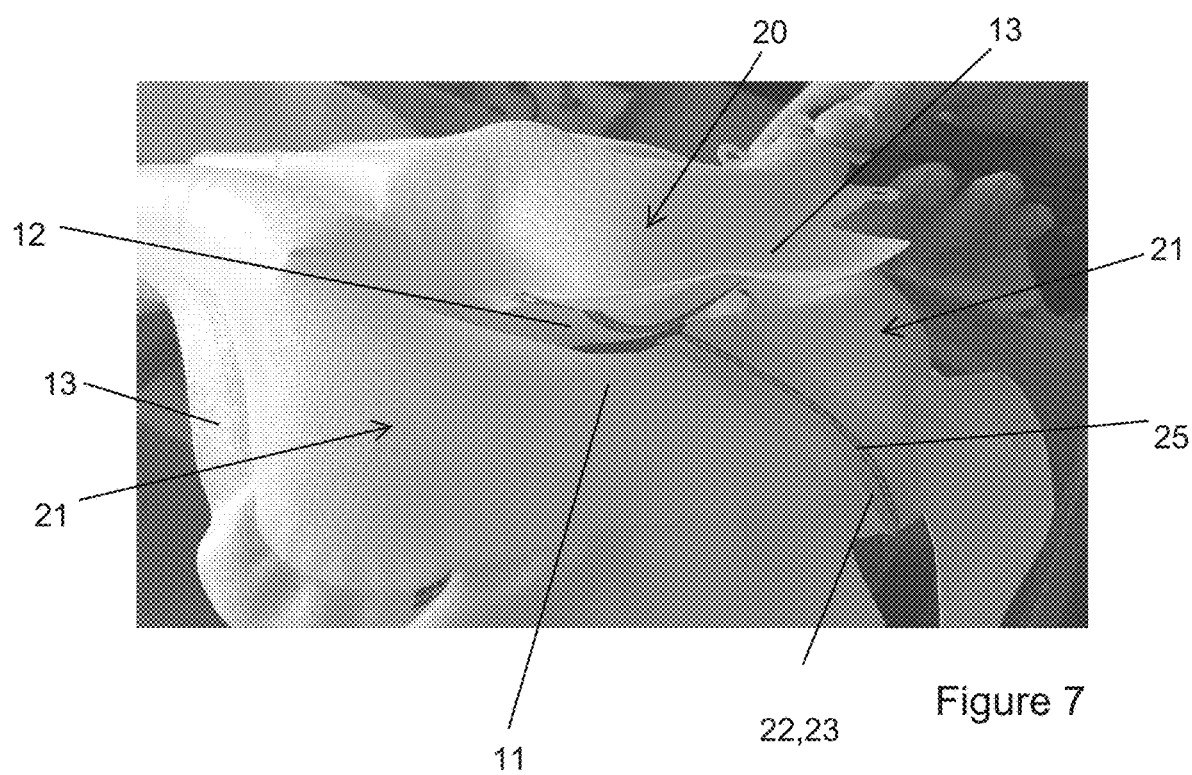
FIG. 7 is a perspective view, illustrating the inlet region of the inflatable chamber in the inflated condition.

Turning now to consider FIGS. 6 and 7, the above-described airbag 10 is illustrated in an inflated condition, representative of its shape and configuration following actuation of the inflator 27 and thus inflation of the inflatable chamber 15. As illustrated, both the inlet region and the two wing regions 21 achieve an inflated configuration in which the fabric layers 11, 12 are urged apart by the inflating gas from the inflator 27.

As will be appreciated, were the peripherally spaced-apart regions 22, 23 of the peripheral seam 13 not interconnected and secured as described above, with the two wing regions 21 of the inflatable chamber 15 interconnected beneath the inlet region 20, then the airbag 10 would naturally achieve a generally flat two-dimensional inflated shape upon inflation, in which the peripheral seam 13 would follow a generally planar path around the airbag 10. However, because of the manner in which the peripherally spaced-apart regions 22, 23 of the peripheral seam 13 are in fact interconnected and secured to one another adjacent the inlet region 21, the effect of their interconnection is to induce a three-dimensional inflated shape to the inflatable chamber 15 upon inflation of the airbag, in which the peripheral seam 13 instead follows a non-planar path. This is illustrated most clearly in FIG. 7, where it can be seen that the inlet region 20 of the inflatable chamber 15 bears against the wing regions 21 in their inflated configurations, which thereby i) urges the wing regions 21 slightly downwardly, and ii) urges the inlet region 20 slightly upwardly, such that regions of the peripheral seam extending around and bounding the wing regions 21 of the inflatable chamber extend out of plane with regions of the peripheral seam extending around and bounding the inlet region 20. The inflated shape of the inflatable chamber 15 thereby achieves a two-tiered configuration in the area of the inflator 27, the inlet region 20 and the wing regions 21, with the inflated shape of the inlet region 20 representing an upper tier, and the inflated shape of the wing regions 21 representing a lower tier. Furthermore, because the inflated inlet region 20 bears against the inflated wing regions 21, the inlet region 20 may offer some support to the wing regions 21 and vice-versa.

As will also be appreciated from FIGS. 6 and 7, when the airbag 10 is inflated, the inlet region 20 of the inflatable chamber overlies the interconnected first and second regions 22, 23 of the peripheral seam 13, and is superimposed with the two wing regions 21 such that the lower layer of fabric 12 of the inlet region 20 bears against the upper layer of fabric 11 of the wing regions 21. Furthermore, having regard to FIG. 5, it should also be appreciated that when the airbag 10 is inflated, one of the wing regions 21 of the inflatable chamber 15 will adopt an inflated configuration in which it lies adjacent and bears against the inflator 27, thereby offering the possibility of supporting the inflator 27 and providing a cushioning effect to provide protection for a vehicle occupant (or a pedestrian in the case of a pedestrian airbag) against potentially injurious impact with the inflator 27 in an accident. The fact that the wing region 21 lies adjacent the inflator 27 also offers some protection to the occupant (or pedestrian) from the risk of burning, as it will help to prevent contact with the inflator 27 which can become very hot upon actuation.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps. It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the invention that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

The invention claimed is:

1. An inflatable airbag for a motor vehicle, the inflatable airbag comprising:
a pair of superimposed layers of fabric interconnected by a peripheral seam extending around and defining the bounds of a single inflatable chamber between said layers; and
said single inflatable chamber having an inlet region comprising a fluid inlet connected to an inflator,
wherein the inflatable airbag includes first and second peripherally spaced-apart regions of said peripheral seam directly interconnected and secured to one another such that said inlet region is superimposed with at least one other region of the inflatable chamber to thereby induce an inflated shape to said chamber upon inflation of the airbag by a flow of gas from said inflator, and
said inflated shape includes said at least one other region of the inflatable chamber lying adjacent said inflator upon inflation of the airbag.

2. The inflatable airbag according to claim 1, wherein said inflated shape is further arranged such that said at least one other region of the inflatable chamber bears against said inflator upon inflation of the airbag.

3. The inflatable airbag according to claim 1, wherein said inflated shape has a two-tiered configuration in which said inlet region bears against said at least one other region.

4. The inflatable airbag according to claim 1, wherein said pair of superimposed fabric layers comprise an upper fabric layer and a lower fabric layer, and wherein said inlet region of the inflatable chamber is superimposed with said other region such that said lower fabric layer of the inlet region bears against said upper fabric layer of the or each other region when the airbag is inflated.

5. The inflatable airbag according to claim 1, wherein said first and second regions of said peripheral seam are interconnected and secured to one another such that said inlet region of said inflatable chamber is superimposed with two discrete other regions of said inflatable chamber.

6. The inflatable airbag according to claim 5, wherein said two discrete other regions of said inflatable chamber are of substantially identical shape and configuration.

7. The inflatable airbag according to claim 5, wherein said first region of the peripheral seam bounds part of one of said discrete other regions of the inflatable chamber, and said second region of the peripheral seam bounds part of the other of said discrete other regions of the inflatable chamber, and wherein said two discrete other regions of the inflatable chamber are interconnected by connection of said first and second regions of the peripheral seam to one another.

8. The inflatable airbag according to claim 7, wherein said two discrete other regions of said inflatable chamber are substantially mirror symmetrical about said connection between the first and second regions of the peripheral seam.

9. The inflatable airbag according to claim 1, wherein said inlet region of the inflatable chamber overlies said first and second regions of the peripheral seam.

10. The inflatable airbag according to claim 1, wherein said peripheral seam has an interconnection width across which said layers of fabric are interconnected, and wherein said first and second regions of the peripheral seam are interconnected and secured to one another by a connection formed wholly within said interconnection width.

11. The inflatable airbag according to claim 10, wherein said interconnection width varies along said peripheral seam and is greater at said first and second regions of the peripheral seam than elsewhere along the seam.

12. The inflatable airbag according to claim 10, wherein said connection comprises stitching.

13. The inflatable airbag according to claim 1, wherein said first and second regions of the peripheral seam are interconnected and secured to one another by stitching.

14. The inflatable airbag according to claim 1, wherein said first and second regions of the peripheral seam are superimposed.

15. The inflatable airbag according to claim 1, wherein each said layer of fabric is woven and comprises a plurality of yarns, at least some of the yarns of one said layer of fabric being interwoven with at least some of the yarns of the other said layer to define said peripheral seam, the peripheral seam thereby being woven and integral to the structure of said layers.

16. An inflatable airbag for a motor vehicle, the inflatable airbag comprising:
a pair of superimposed layers of fabric interconnected by a peripheral seam extending around and defining the bounds of a single inflatable chamber between said layers; and
said single inflatable chamber having an inlet region comprising a fluid inlet connected to an inflator,
wherein the inflatable airbag includes first and second peripherally spaced-apart regions of said peripheral seam secured to one another such that said inlet region is superimposed with at least one other region of the inflatable chamber to thereby induce an inflated shape to said chamber upon inflation of the airbag by a flow of gas from said inflator,
said inflated shape includes said at least one other region of the inflatable chamber lying adjacent said inflator upon inflation of the airbag, and
wherein said pair of superimposed fabric layers comprise an upper fabric layer and a lower fabric layer, and wherein said inlet region of the inflatable chamber is superimposed with said other region such that said lower fabric layer of the inlet region bears against said upper fabric layer of the or each other region when the airbag is inflated.

* * * * *